United States Patent
Guan et al.

(10) Patent No.: US 9,582,558 B2
(45) Date of Patent: Feb. 28, 2017

(54) METHOD AND SYSTEM FOR DATA DEFINITION LANGUAGE (DDL) REPLICATION

(75) Inventors: Ruifeng Guan, Shanghai (CN); Qi Yang, Shanghai (CN)

(73) Assignee: SYBASE, INC., Dublin, CA (US)

( * ) Notice: Subject to any disclaimer, the term of this patent is extended or adjusted under 35 U.S.C. 154(b) by 1465 days.

(21) Appl. No.: 12/131,679

(22) Filed: Jun. 2, 2008

(65) Prior Publication Data

US 2009/0300075 A1    Dec. 3, 2009

(51) Int. Cl.
   *G06F 7/00*       (2006.01)
   *G06F 17/00*      (2006.01)
   *G06F 17/30*      (2006.01)

(52) U.S. Cl.
   CPC .. *G06F 17/30575* (2013.01); *G06F 17/30557* (2013.01)

(58) Field of Classification Search
   CPC ......... G06F 17/30575; G06F 17/30578; G06F 17/30581
   USPC ..... 707/610, 615, 648, 702, 999.2, 999.201, 707/999.202
   See application file for complete search history.

(56) References Cited

U.S. PATENT DOCUMENTS

| | | | |
|---|---|---|---|
| 5,799,306 A * | 8/1998 | Sun et al. | |
| 5,889,674 A * | 3/1999 | Burdick et al. | 700/121 |
| 6,122,640 A * | 9/2000 | Pereira | 707/648 |
| 6,405,212 B1 * | 6/2002 | Samu et al. | |
| 6,421,677 B1 * | 7/2002 | DeKimpe et al. | |
| 7,031,974 B1 * | 4/2006 | Subramaniam | |
| 7,072,911 B1 * | 7/2006 | Doman et al. | 707/615 |
| 7,236,993 B2 * | 6/2007 | Brown et al. | 707/604 |
| 2003/0130985 A1 * | 7/2003 | Driesen et al. | 707/1 |
| 2004/0098425 A1 * | 5/2004 | Wiss et al. | 707/204 |
| 2005/0125430 A1 * | 6/2005 | Souder et al. | 707/100 |
| 2005/0138160 A1 * | 6/2005 | Klein et al. | 709/223 |
| 2005/0165858 A1 * | 7/2005 | Tom et al. | 707/201 |
| 2005/0246338 A1 * | 11/2005 | Bird | G06F 21/6227 |
| 2005/0278709 A1 * | 12/2005 | Sridhar et al. | 717/136 |
| 2005/0289186 A1 * | 12/2005 | Guo et al. | 707/200 |

(Continued)

OTHER PUBLICATIONS

Joseph Sack: "SQL Server 2005 T-SQL recipes: a problem-solution approach". Chapter 12, pp. 313-336. Dec. 2005.*

(Continued)

*Primary Examiner* — James Trujillo
*Assistant Examiner* — John J Morris
(74) *Attorney, Agent, or Firm* — Sterne, Kessler, Goldstein & Fox P.L.L.C.

(57) ABSTRACT

Systems, methods and computer program products for DDL replication are described herein. An embodiment includes a replication agent to instantiate one or more DDL triggers in a primary database and a replication server to provide DDL command text to a replicate database based on said DDL triggers. The replication agent uses the DDL trigger(s) to capture one or more DDL events and retrieve a transaction log associated with the DDL events. The replication agent processes the transaction log to obtain DDL command text. The DDL command text is then sent to a replicate database by the replication server where it is executed in an appropriate user context. In this way, DDL commands in may be replicated using DDL trigger(s) and session context switching.

22 Claims, 9 Drawing Sheets

(56) References Cited

U.S. PATENT DOCUMENTS

| | | | |
|---|---|---|---|
| 2006/0047713 A1* | 3/2006 | Gornshtein et al. | 707/202 |
| 2006/0069688 A1* | 3/2006 | Shekar | 707/100 |
| 2007/0005600 A1* | 1/2007 | Dutta | G06F 21/6218 |
| 2007/0050391 A1* | 3/2007 | Chatterjee et al. | 707/101 |
| 2007/0112456 A1* | 5/2007 | Sanka et al. | 700/197 |
| 2007/0130231 A1* | 6/2007 | Brown | G06F 11/3409 |
| 2007/0143375 A1* | 6/2007 | Tom et al. | 707/204 |
| 2008/0034014 A1* | 2/2008 | Beck et al. | 707/204 |
| 2008/0098045 A1* | 4/2008 | Radhakrishnan et al. | 707/203 |
| 2008/0243936 A1* | 10/2008 | Li et al. | 707/200 |
| 2009/0125359 A1* | 5/2009 | Knapic et al. | 705/8 |

OTHER PUBLICATIONS

"Using Triggers to Track Databse Action History" by Tal Kelley. Published Wednesday, Sep. 19, 2001. http://www.4guysfromrolla.com/webtech/091901-1.shtm.*

"Using Triggers to Track Databse Action History" by Tal Kelley. Published Wednesday, Sep. 19, 2001. http://www.4guysfromrolla.com/webtech/091901-1.shtml.*

* cited by examiner

METHOD AND SYSTEM FOR DATA DEFINITION LANGUAGE (DDL) REPLICATION

BACKGROUND

Field of the Invention

The present invention relates to database systems, and more particularly to replication of data definition languages (DDL).

Background Art

Data replication is the process of maintaining multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively become online backup copies if a failure occurs.

Languages used for data manipulation and replication, such as SQL, can be divided into two main sublanguages, namely the data definition language (DDL) and the Data Manipulation Language (DML).

The data definition language comprises commands used to create and destroy databases and database objects. After the database structure is defined with DDL, database administrators and users can utilize the data manipulation language (DML) to insert, retrieve and modify the data included within it.

In some cases, databases may assist replication of DDL commands, keeping a log of DDL command text. However, not all databases support this feature.

Therefore, what is needed is a system, method and computer program product that allows replication of DDL commands in environments where DDL command text is not logged, stored or recorded.

BRIEF SUMMARY

Briefly stated, the invention includes system, method, computer program product embodiments and combinations and sub-combinations thereof for enabling replication of data definition languages (DDL).

In an embodiment, a DDL trigger is used to capture a DDL event. When a user makes any schema changes to a database, such as creating a table or altering a view, a primary database logs the DDL operations into a log file and the corresponding DDL events occur automatically. After the DDL events occur, the DDL trigger captures the events, analyzes the events and retrieves related information for later use, including command text, user information and event type. In an embodiment, the DDL trigger inserts DDL event related information into a DDL shadow table. In an embodiment, all operations performed by the DDL trigger are logged into a transaction log by the database. A replication agent then reads and processes the transaction log. The replication agent then sends a DDL command to the replication server to execute the command in a replicate database.

In this way, DDL commands are replicated in environments where DDL command text is not logged, stored or recorded.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to systems, methods and computer program products for the replication of DDL commands using DDL triggers.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This detailed description of embodiments of the present invention is organized into several sections as shown by the following table of contents.
Table of Contents
1. System
2. DDL Triggers
3. Replication Agent
   3.1 Capturing a DDL Event
      3.1.1 Exemplary Schema of DDL Shadow Table
   3.2 Constructing DDL Command Text
   3.3 Session Context Switching
   3.4 Exemplary Overall Operation of DDL Replication
4. Filtering DDL Commands
   4.1 Transaction Filter
   4.2 Repository Filter
5. Exemplary Database level Triggers and Server Level Triggers
6. Exemplary Creation of a DDL Trigger and Shadow Table
7. Exemplary Switch Session Context
8. Exemplary DDL Type and Create Object 9. Exemplary DDL and Object Relation
10. Exemplary Single DDL and Multi-DDL User Transaction
11. Example Computer Embodiment
12. Conclusion

1. System

Figure 1:
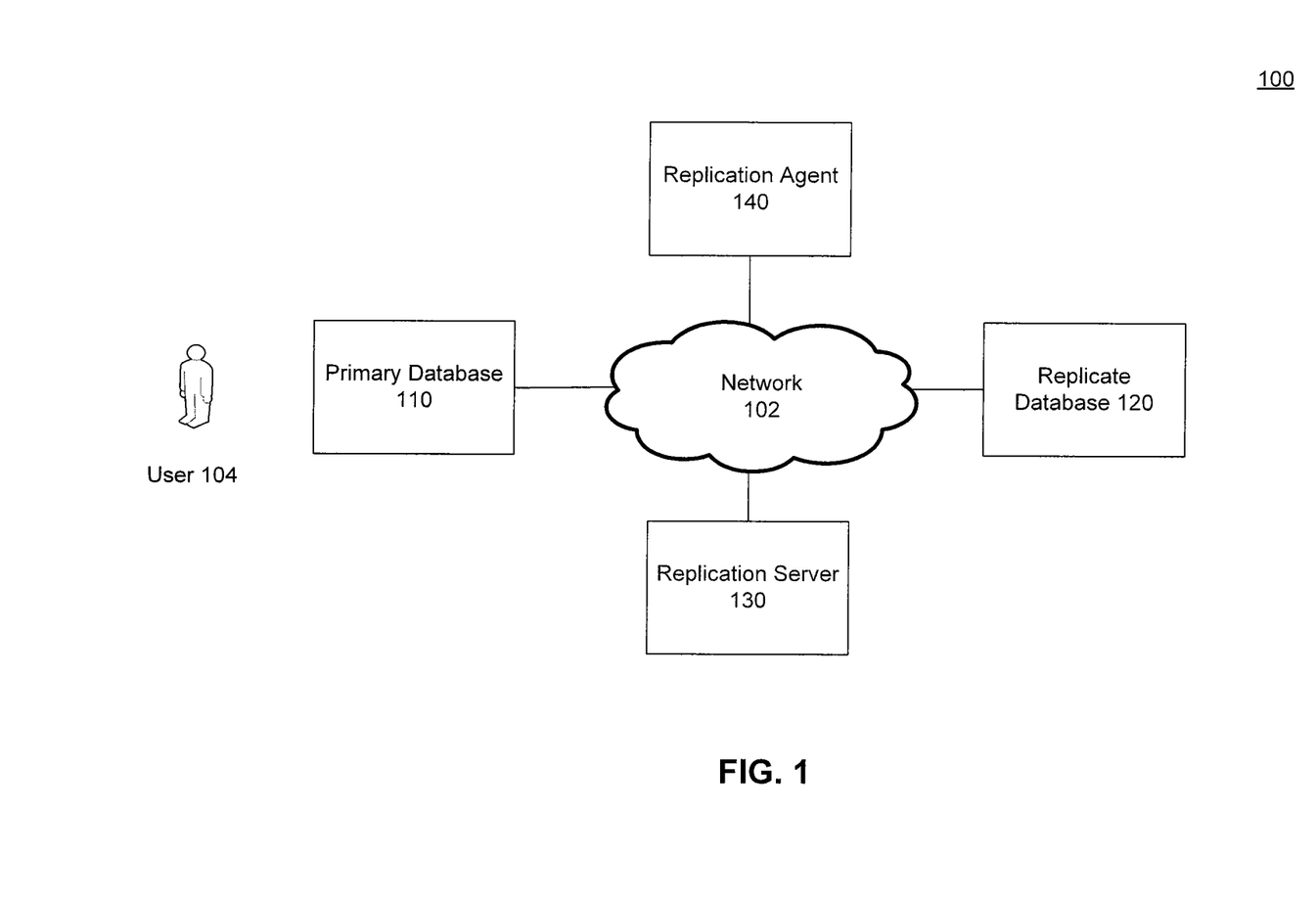
FIG. 1 is a block diagram of an exemplary replication environment, according to an embodiment of the invention.

This section describes a general system architecture for DDL replication according to an embodiment of the invention as illustrated in FIG. 1.

FIG. 1 includes primary database 110, replication agent 140, replication server 130 and replicate database 120. (While the following is described in terms of data definition language (DDL), the invention is not limited to this embodiment and other definition languages may be used. The invention is applicable to any system having generally the structure of FIG. 1, or that would benefit from the operation, methods and functions as described herein.)

Primary database 110 may be any form of database and can include, but is not limited to, a device having a processor and memory for executing and storing instructions. In an example, not intended to limit the invention, MICROSOFT SQL Server may be used as primary database 110. Such a database may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

In an embodiment, primary database 110 is a source of transactions that modify data in the replicate database 120. Tables marked for replication in a primary database 110 may be known as primary tables (not shown). A primary table must be marked for replication so that replication agent 140 can identify and replicate the transactions that affect the data in that table.

Replication agent 140 may capture replicated transactions in primary database 110, and then may send those transactions to a replication server 130 for distribution to replicate database 120. In an embodiment, replication agent 140 may update a transaction log in the primary database 110 and may generate an output. This output may be used to distribute replicated transactions throughout system 100.

In an embodiment, replication agent 140 runs as a stand-alone application, independent of the primary database server 110, the replication server 130, and any other replication system components. In another embodiment, replication agent 140 may reside on the same host machine, for example, primary database 110 or any other replication system component, or it can reside on a machine separate from any other replication system components. Replication agent 140 is described in greater detail below.

Replication server 130 may receive replicated transactions from replication agent 140. In an embodiment, replication server 130 may send replicated transactions to replicate database 120 in response to one or more commands from replication agent 140. As an example, when the replicated transaction is processed successfully by replicate database 120, the replicate database 120 is synchronized with data in primary database 110.

Network 102 can be any type of network or combination of networks such as, but not limited to, a local area network, wide area network or the Internet. Network 102 may be a form of a wired network or a wireless network, or a combination thereof. Network 110 may allow primary database 110, replication server 130, replication agent 140 and replicated database 120 to communicate with each other.

2. DDL Triggers

Figure 2:
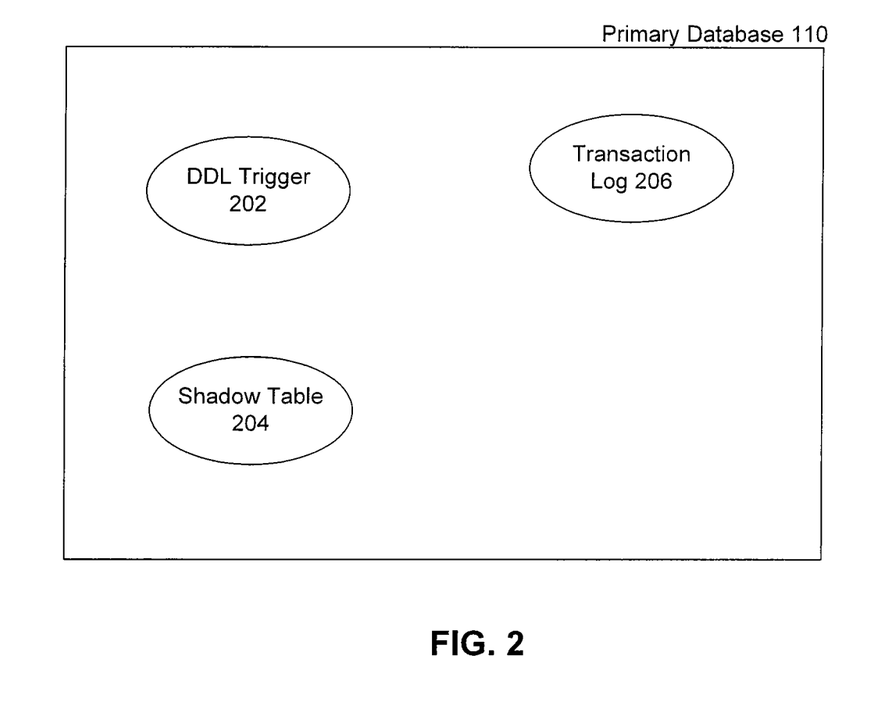
FIG. 2 is a diagram illustrating a primary database, according to an embodiment of the invention.

Referring to FIG. 2, replication agent 140 may create DDL trigger 202 in primary database 110. In an embodiment, replication agent 140 connects to primary database 110, creates a DDL trigger, for example, DDL trigger 202, during initialization. Replication agent 140 also creates a DDL shadow table 204. An exemplary DDL shadow trigger is described in detail further below.

DDL triggers, for example, DDL trigger 202, may also record other information replication agent 140 needs to replicate a given transaction, for example, a transaction ID that identifies each operation associated with the transaction. When fired, DDL trigger 202 may record data to be replicated in one or more transaction log tables, for example, transaction log 206 in primary database 110. DDL trigger 202 could capture information of DDL events and record such information into DDL shadow table 204. Furthermore, in an embodiment, the information for one DDL event can be split into two rows in DDL shadow table 204.

In an embodiment, replication agent 140 may store DDL trigger 202 in primary database 110 when a database table is marked for replication by user 104. DDL trigger 202 may be created in primary database 110 when replication agent 140 is being initialized.

DDL trigger 202 may initiate system stored procedures in response to an event. DDL trigger 202 may fire in response to a variety of DDL statements. These statements may start with SQL commands such as CREATE, ALTER, and DROP. DDL triggers may also be used for administrative tasks such as auditing and regulating operations associated with primary database 110. As an example, not intended to limit the invention, DDL trigger 202 may be used to prevent certain changes to a schema of primary database 110, to initiate an operation in the database in response to a change in the schema of primary database 110 or to record changes in the schema of primary database 110.

3. Replication Agent

This section describes the operation of replication agent 140 according to an embodiment of the invention. In an embodiment, replication agent 140 may use DDL trigger 202 for DDL replication.

3.1 Capturing a DDL Event

In order to obtain DDL information, a DDL trigger, for example trigger 202A, may be used to capture one or more DDL events and store DDL information in shadow table 204 used by replication agent 140. As an example, DDL information includes event time, event user, event login, schema name, schema id, event type, object name, command text and/or a flag which indicates the command text is complete or not. When a DDL statement is executed, a DDL event will fire a DDL trigger, for example DDL trigger 202A. DDL trigger 202A may then use an "event data" function to get the DDL information which will be saved in shadow table 204. In an embodiment, two operations, one of which is DDL event and the other, an insert operation against shadow table 204 may be in the same transaction. As an example, if an insert operation occurs against shadow table 204, it may be used by replication agent 140 to detect firing of a DDL event.

In this way, one or more DDL events are captured by DDL trigger 202. DDL command information is inserted into shadow table 204 and logged into transaction log 206 by primary database 110. Replication agent 140 may then read DDL related information from transaction log 206.

3.1.1 Exemplary Schema of a DDL Shadow Table

In an embodiment, DDL information may be saved by DDL trigger 202 in shadow table 204. As an example, DDL information includes event time, event user, event login, schema name, schema id, event type, object name, command text and/or a flag which indicates the command text is complete or not. Additionally, an identity column as the primary key of shadow table 204 may be included.

TABLE 1

| column_name | data_type | Null? |
| --- | --- | --- |
| ddlid_ | Int | N |
| postTime_ | Datetime | Y |
| dbUser_ | nvarchar(128) | Y |
| event_ | nvarchar(100) | Y |
| objname_ | nvarchar(128) | Y |
| tsql_ | narchar(3000) | Y |
| loginName_ | nvarchar(128) | Y |
| schemaName_ | nvarchar(128) | Y |
| schemaid_ | Int | Y |
| isLast_ | tinyint | Y |

Table 1 illustrates an exemplary shadow table named "ra_ddl_log_". In the above table:

ddlid_ is the primary key of the DDL shadow table. It may be identified by (1, 1).

postTime_ is the execute time of a DDL event. In an embodiment, all DDL events have this element.

dbUser_ is the user who executes DDL. The system needs to know the user name to switch session context in rdb.

event_ is a type of DDL event which may be used to identify DDL type.

tsql_ is the command text of DDL. In an embodiment, if the text of DDL includes a password, tsql will be NULL.

objname_ is the name of DDL related object. An example of a DDL replicated object is provided below.

loginName_ is the login name of the dbUser_.

schemaName_ is the schema name of the object.

schemaId_ is the schema id of the object.

idLast_ indicates whether the DDL command text is complete or not. If the command text is too long, for example, more than three thousand bytes, the command text will be divided into several rows instead of one row. idLast_ is used to indicate whether it is the last row for the command text.

3.2 Constructing DDL Command Text

Figure 3:
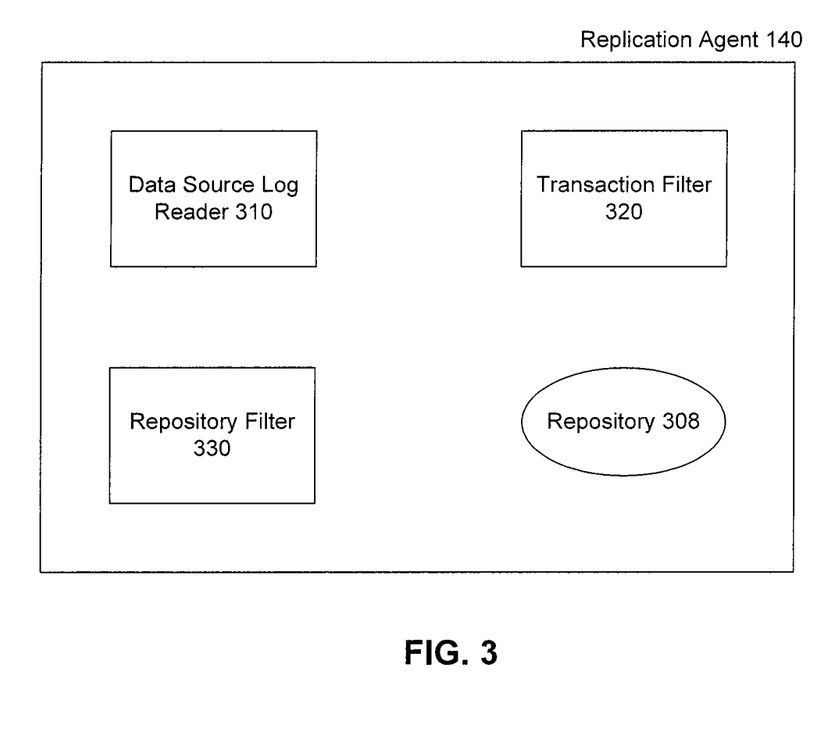
FIG. 3 is a diagram illustrating a replication agent, according to an embodiment of the invention.

Referring to FIG. 3, a data source log reader 310 in the replication agent 140 may detect an insert operation against shadow table 204. This indicates that at least one DDL event has occurred.

As an example, not intended to limit the invention, when data source log reader 310 detects an insert operation in shadow table 204, transaction log 206 may provide data source log reader 310 with the following information that data source log reader 310 needs:

(a) postTime
(b) dbUser
(c) event
(d) tsql
(e) objName
(f) loginName
(g) schemaName
(h) schemaId
(i) isLast In an embodiment, if "isLast" is true, replication agent 140 may construct DDL command text immediately; otherwise it may wait for the next insert operation to obtain another portion of command text. Based on information received by data source log reader 310, transaction filter 320 and repository filter 330 may determine whether a DDL command should be filtered. In an embodiment, all unexpected DDL commands will be filtered by transaction filter 320 and repository filter 330. Filtering of DDL commands is described below.

3.3 Session Context Switching

In an embodiment, a session may start when user 104 logs in primary database 110 and ends when user 104 logs off. All operations during a session are subject to permission checks against user 104 or any other user. As an example, when an "EXECUTE AS" statement is running, the execution context of the session is switched by replication agent 140 to the specified login or user name. After the context switch, permissions may be checked by replication agent 140. Such permissions may be checked against the login and user security tokens for that account instead of another user initiating the "EXECUTE AS" statement. As an example, the user or login account may be impersonated for the duration of the session or module execution, or the context switch may be explicitly reverted. The change in execution context may remain in effect until at least one of the following occurs: (i) another EXECUTE AS statement is run, (ii) a REVERT statement is run, or (iii) the session is dropped. An exemplary session context switch is described further in the description.

3.4 Exemplary Overall Operation of DDL Replication

Figure 4A:
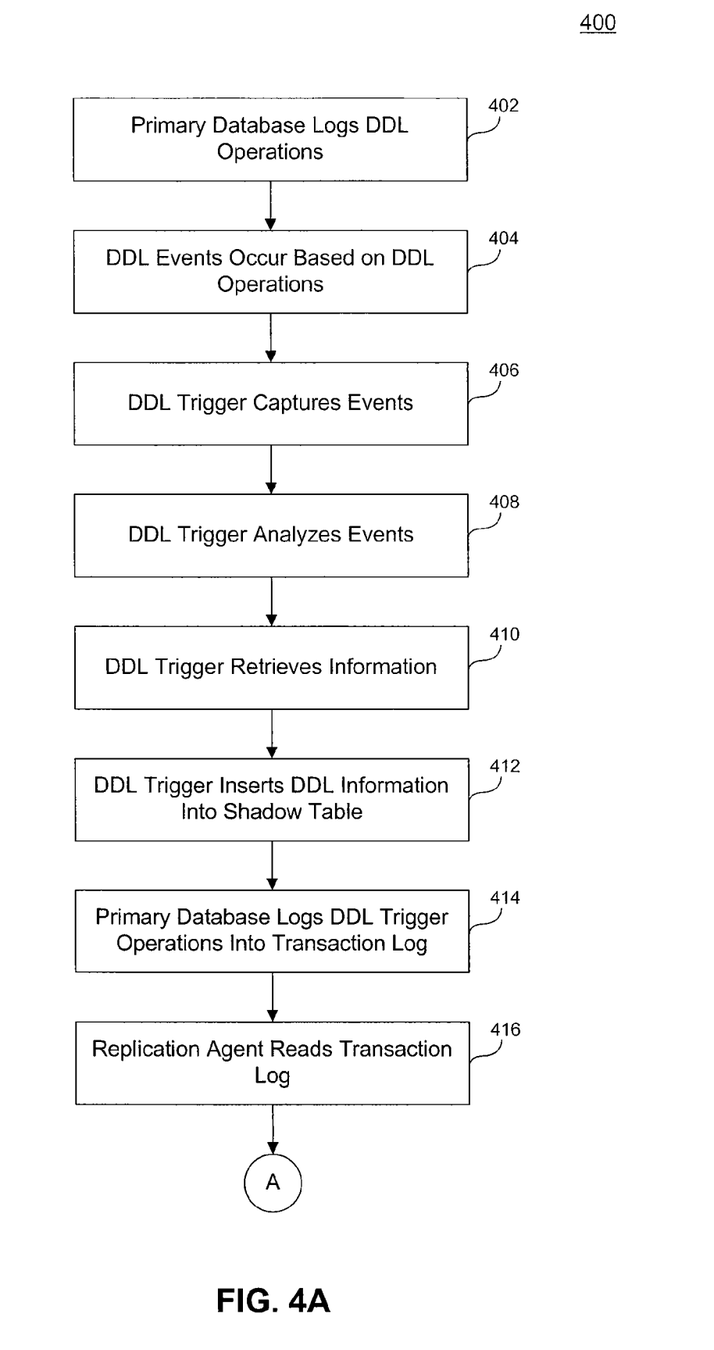
FIGS. 4A, 4B and 4C are a flowcharts illustrating an exemplary method for DDL replication, according to an embodiment of the invention.
Figure 4B:
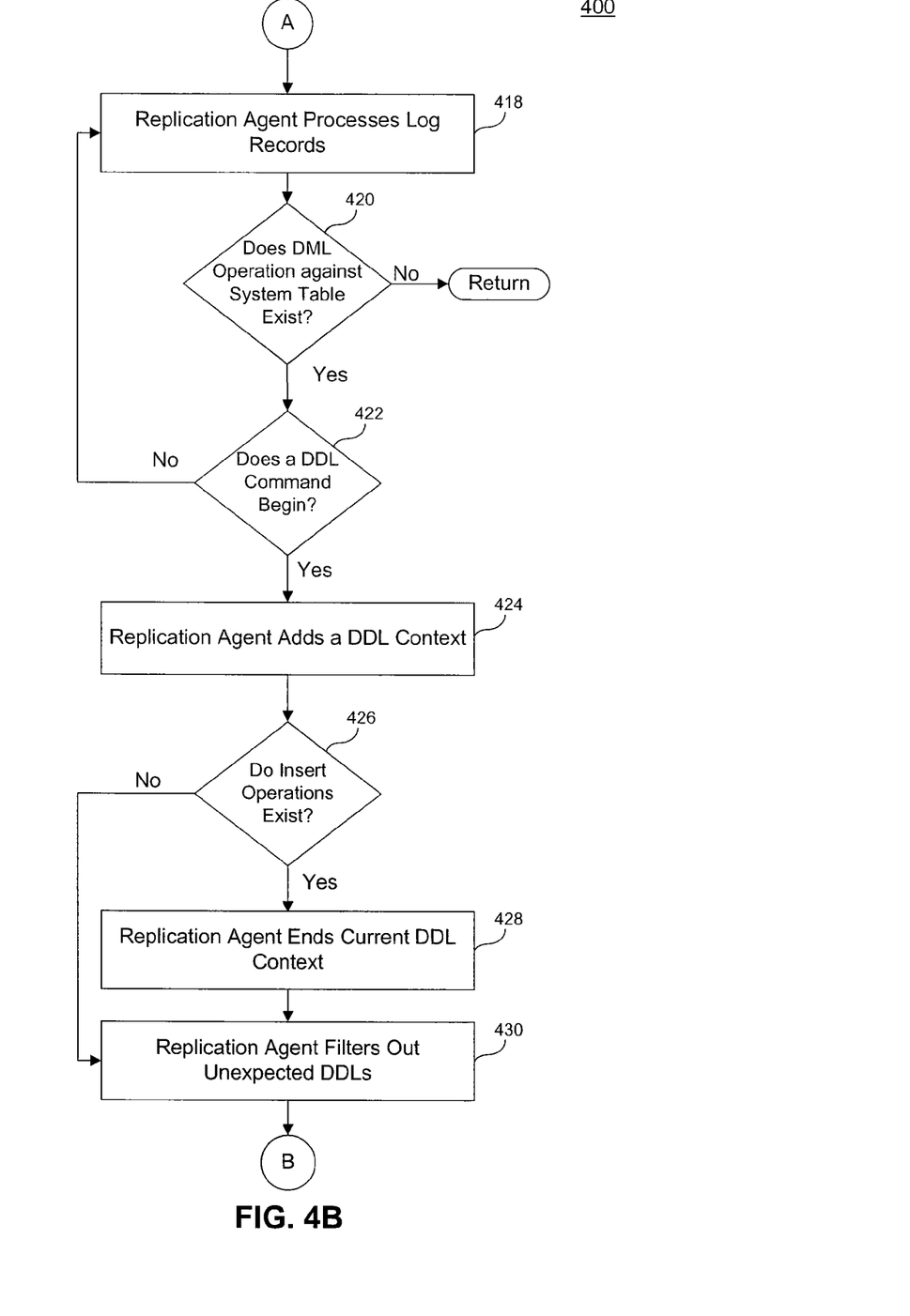
Figure 4C:
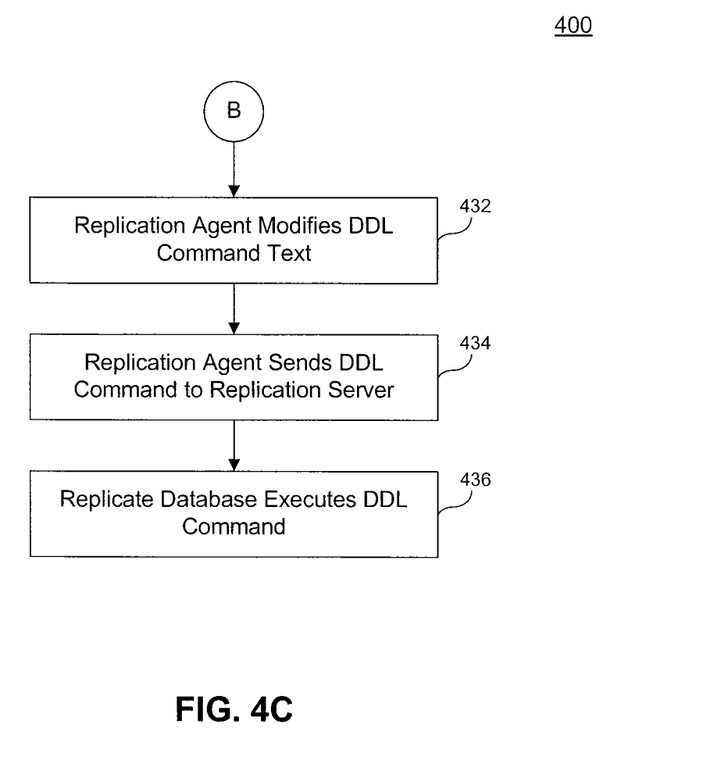

An exemplary method for DDL replication according to an embodiment of the invention will now be described in detail with reference to flowchart 400 in FIGS. 4A, 4B and 4C.

In step 402, primary database 110 may log DDL operations into transaction log 206.

In step 404, the log operations that are carried out by primary database 110 in step 402, may cause corresponding DDL events to occur automatically. As an example, when users make any schema changes to database, such as creating a table, altering a view, dropping a trigger and so on, primary database 110 may log the DDL operations into transaction log 206, causing corresponding DDL events to occur automatically.

In step 406, DDL trigger 202A may capture events generated in step 404.

In step 408, DDL trigger 202A may analyze the events captured in step 406.

In step 410, DDL trigger 202A may retrieve all related information for use based on the analysis of events in step 408. As an example, DDL trigger may retrieve command text, user information, event type and so on.

In step 412, DDL trigger 202A may insert DDL event related information into shadow table 204.

In step 414, operations performed by DDL trigger 202A will be logged into transaction log 206 by primary database 110 and used by replication agent 140.

In step 416, replication agent 140 may read log records from transaction log 206 and then process them.

In step 418, replication agent 140 processes log records read from transaction log 206 in step 416.

In step 420, replication agent 140 checks for a DML operation to system tables associated with primary database 110. If replication agent 140 finds a DML operation to the system tables, step 422 is performed. If replication agent 140 does not find a DML operation to the system tables, method 400 returns and is complete.

In step 422, replication agent 140 checks if a DDL command begins or not. If a DDL command begins, step 424 is performed. If a DDL command does not begin control returns to step 418.

In step 424, replication agent 140 adds a DDL context to generate schema changes in primary database 110.

In step 426, replication agent 140 checks for any insert operations in shadow table 204. If replication agent 140 identifies any insert operations in the shadow table, step 428 is performed. If replication agent does not identify any insert operations, step 430 is performed.

In step 428, replication agent 140 ends the current DDL context.

In step 430, replication agent 140 may filter out all unexpected DDLs. As an example, replication agent 140 may filter out unexpected DDLs using transaction filter 320 and repository filter 330.

In step 432, replication agent 140 may modify DDL command text so that the DDL can be executed by the proper user. This step is performed because, when a DDL command is executed in replicate database 120, the session context needs to be switched to appropriate user session context.

In step 434, replication agent 140 sends the command modified in step 432 to replication server 130.

In step 436, replicate database 120 executes the DDL command under appropriate user session context.

In this way, according to method 400, DDL may be replicated according to an embodiment of the invention.

4. Filtering DDLs

In an embodiment, DDL trigger 202 catches DDL events associated with primary database 110, including user DDL commands and system DDL commands.

A system DDL command, for example, is a DDL command used to create, alter or drop a system object. In order to recognize a system DDL command, it may be necessary to identify a system object. After an object is created or altered, if the object is a system object, a flag bit (not shown) associated with the system object will be toggled. Using the flag bit, a system object may be identified by replication agent 140. The system object is then used to identify a system DDL command.

In some cases, system level DDL commands are not to be replicated to replicate database 120. Thus, it may be necessary to filter system DDL commands. Besides system DDL commands, some events associated with DDL commands may include a password which may be caught by DDL trigger 202. Since, in such scenarios, command text may be null, these DDL commands may need to be filtered.

Referring to FIG. 3, replication agent 140 may include transaction filter 320 and repository filter 330 to filter DDL commands before they are sent to replication server 130. The operation of transaction filter 320 and repository filter 330 is described in the following sections.

4.1 Transaction Filter 320

Figure 5:
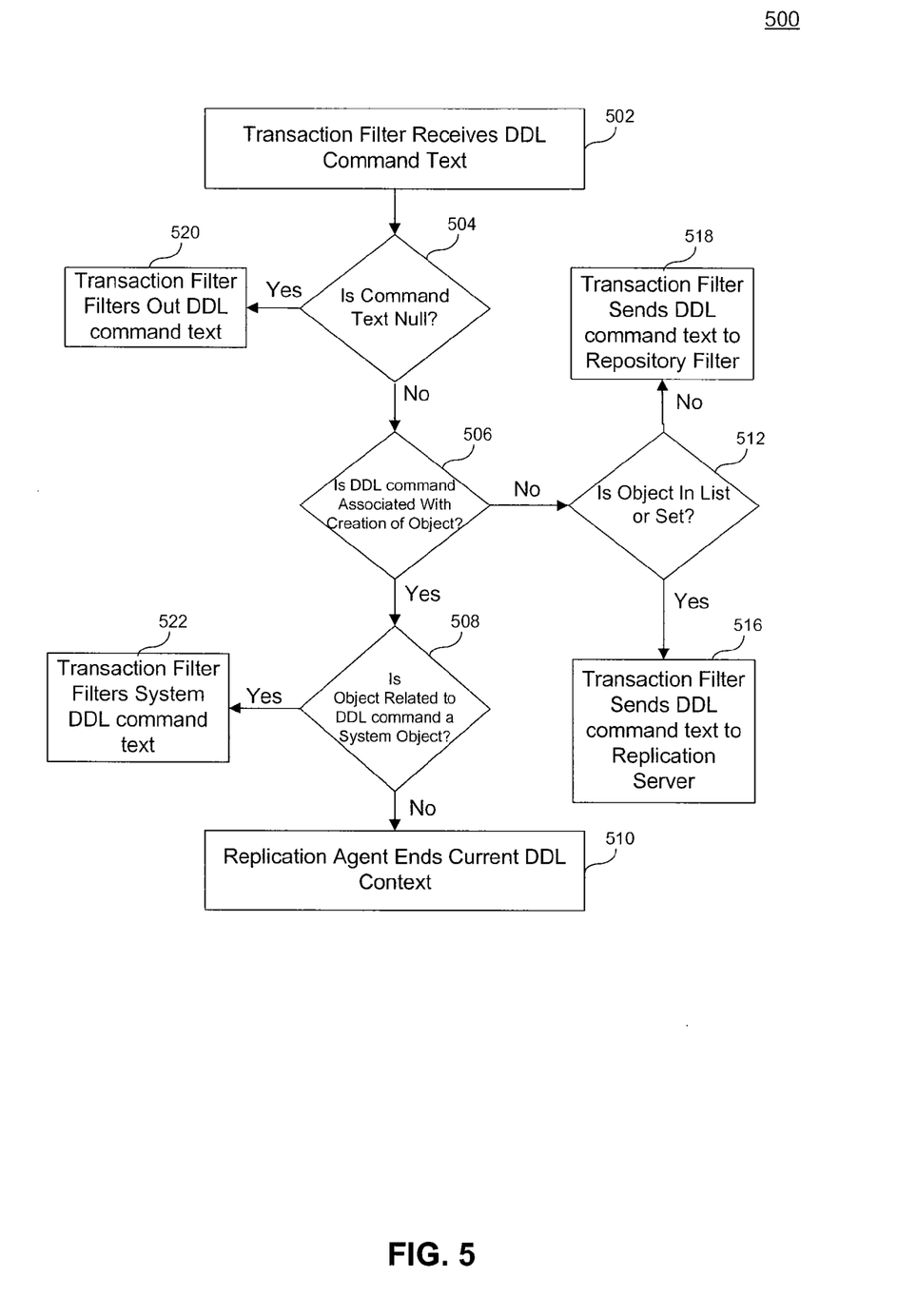
FIG. 5 is a flowchart illustrating the operation of a transaction filter, according to an embodiment of the invention.

The operation of an exemplary transaction filter, according to an embodiment of the invention will be described in detail with reference to flowchart 500 in FIG. 5, according to an embodiment of the invention.

In step 502, transaction filter 320 receives DDL command text from replication agent 140.

In step 504, transaction filter 320 checks if the command text is null. If command text is null, step 520 is performed, wherein the DDL command text is filtered out as it may not be supported. If the command text is not null, step 506 is performed.

In step 506, transaction filter 320 checks if the DDL command type is associated with the creation of an object. As an example, transaction filter 320 may check if the DDL command type is associated with the creation of an object. If the DDL command type is associated with the creation of an object, step 508 is performed.

In step 508, transaction filter 320 checks if an object related to the DDL command is a system object. If the related object is a system object, step 522 is performed, wherein transaction filter 320 filters system level DDL command text If, in step 508, it is determined that the related object is not a system object, step 510 is performed. In step 510, replication agent 140 ends a current DDL context.

Referring again to step 506, if the DDL command type is not associated with creation of an object, step 512 is performed.

In step 512, transaction filter 320 checks whether the object is in the list or set. If the object is in the list or set, step 516 is performed. If the object is not in the list or set, step 518 is performed.

In step 516, replication agent 140 sends the command to the replication server 130. As an example, the command will be executed on replicate database 120 under appropriate user session context.

In step 518, the DDL command text is sent to repository filter 330 for further processing.

In this way, transaction filter 320 may filter DDL command text. A DDL command processed by transaction filter 320 may then be sent to repository filter 330 for further filtering.

4.2 Repository Filter 330

Figure 6:
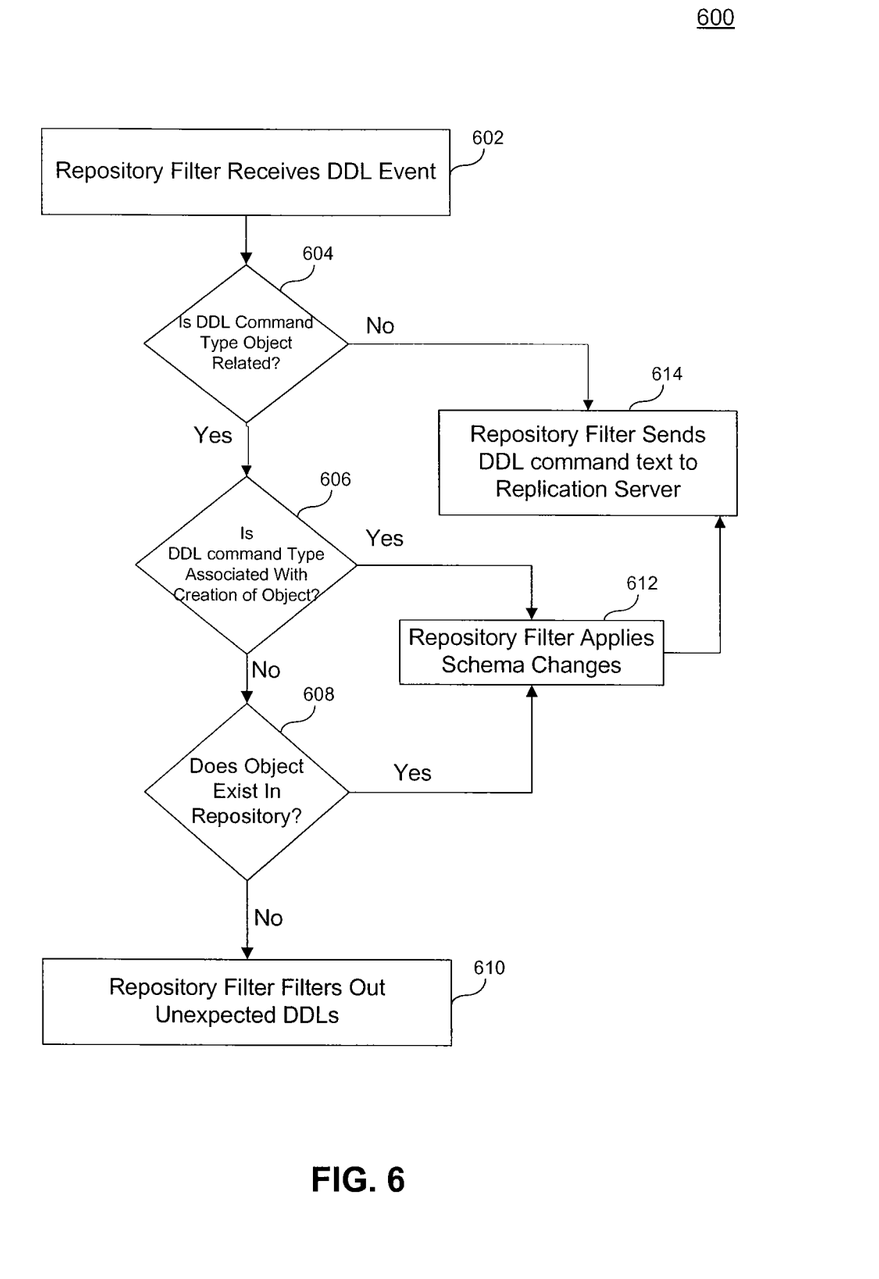
FIG. 6 is a flowchart illustrating the operation of a repository filter, according to an embodiment of the invention.

The operation of an exemplary repository filter 330, according to an embodiment of the invention will be described in detail with reference to flowchart 600 in FIG. 6.

In step 602, repository filter 330 may receive a DDL event from transaction filter 320.

In step 604, repository filter 330 checks whether DDL command type is object related. As an example, object related DDL commands include "create object", "alter object" and "drop object". If the DDL command type is object related, step 606 is performed.

In step 606, repository filter 330 checks if the DDL command type is associated with the creation of an object. If the DDL command type is associated with the creation of an object, step 612 is performed, wherein repository filter 330 applies schema changes to repository 308. Thereafter, in step 614, the DDL command text is sent to replication server 130.

If it is determined in step 606 that the DDL command type is not associated with the creation of an object, step 608 is performed.

In step 608, repository filter 330 checks whether the object related to the current DDL command exists in repository 308. If the object related to the current DDL command exists in repository 308, step 612 is performed (described above). If the object related to the current DDL command does not exist in repository 308, step 610 is performed.

In step 610, repository filter 330 filters unexpected DDL commands.

Returning to step 604, if it is determined that the DDL command type is not object related, step 614 is performed (described above).

In this way, repository filter 330 filters DDL commands, according to an embodiment of the invention.

5. Exemplary Database Level Triggers and Server Level Triggers

In the following example, an exemplary DDL trigger named "safety" will fire whenever a DROP TABLE or ALTER TABLE event occurs in the database:

```
CREATE TRIGGER safety
ON DATABASE
FOR DROP_TABLE, ALTER_TABLE
AS
PRINT 'You must disable Trigger "safety" to drop or alter tables!'
ROLLBACK;
```

In the next example, a DDL trigger prints a message if any CREATE LOGIN, ALTER LOGIN, or DROP LOGIN event occurs in a current server instance. It uses the EVENTDATA function to retrieve the text of the corresponding data manipulation language statement. As an example, Transact-SQL statements may be used.

```
CREATE TRIGGER DDL _trig_login
ON ALL SERVER
FOR DDL _LOGIN_EVENTS
AS
PRINT 'Login Event Issued.'
SELECT
EVENTDATA( ).value('(/EVENT_INSTANCE/TSQLCommand/CommandText)[1]','
nvarchar(max)')
GO
DROP TRIGGER DDL _trig_login
ON ALL SERVER
GO;
```

6. Exemplary Creation of a DDL Trigger and Shadow Table

The following is exemplary SQL script generated by replication agent 140 during initialization to create a DDL trigger and a shadow table.

```
--go to pdb
USE pdb;
GO
--create shadow table "DDL _log"
CREATE TABLE [dbo].[ra_ddl_trig_](
[ddlid] [int] IDENTITY(1,1) NOT NULL,
[posttime] [datetime] NULL,
[dbuser] [nvarchar](128) NULL,
[event] [nvarchar](100) NULL,
[objname] [nvarchar](128) NULL,
[tsql] [nvarchar](3000) NULL,
[loginname] [nvarchar](128) NULL,
[objid] [int] NULL,
[schemaid] [int] NULL,
[schemaname] [nvarchar](128) NULL,
[islast] [tinyint] NULL
);
GO
--create DDL trigger
CREATE TRIGGER [ra_ddl_trig_]
ON DATABASE
FOR DDL_DATABASE_LEVEL_EVENTS
AS
DECLARE @objectname nvarchar(100)
DECLARE @eventType nvarchar(100)
```

```
DECLARE @data XML
DECLARE @tsql nvarchar(MAX)
DECLARE @STEP int
DECLARE @i bigint
DECLARE @tsqllen bigint
DECLARE @islast tinyint
SET @STEP = 3000;
SET @i = 1;
SET @data=EVENTDATA( );
SET @tsql = @data.value('(/EVENT_INSTANCE/TSQLCommand)[1]',
  'nvarchar(max)');
SET @tsqllen = len(@tsql);
WHILE @i < @tsqllen
BEGIN
IF @i + @STEP < @tsqllen
BEGIN
SET @islast = 0;
END
ELSE
BEGIN
SET @islast = 1;
END
INSERT ra_ddl_trig_ (posttime, dbuser,loginname,event, objname,
  objid, schemaname, schemaid, tsql, islast)
VALUES
(GETDATE( ),
CONVERT(nvarchar(100), CURRENT_USER),
CONVERT(nvarchar(100), SYSTEM_USER),
@data.value('(/EVENT_INSTANCE/EventType)[1]', 'nvarchar(100)'),
@data.value('(/EVENT_INSTANCE/ObjectName)[1]', 'nvarchar(255)'),
object_id(@data.value('(/EVENT_INSTANCE/SchemaName)[1]',
  'nvarchar(255)')+ '.' + @data.value('(/EVENT_INSTANCE/
bjectName)[1]', 'nvarchar(255)') ) ,
@data.value('(/EVENT_INSTANCE/SchemaName)[1]',
  'nvarchar(255)'), schema_id(@data.value('(/EVENT_INSTANCE/
SchemaName)[1]', 'nvarchar(255)') ) ,
SUBSTRING (@tsql,@i,@STEP),
@islast) ;
SET @i = @i + @STEP;
DELETE from ra_ddl_trig_;
END
GO
--Test the trigger
CREATE TABLE TestTable (a int)
DROP TABLE TestTable ;
GO
SELECT dbuser, objname, event , tsql, isLast FROM ra_ddl_trig_ ;
GO
--result is:
DBUser objectName  Event  TSQL  isLast
dbo TestTable CREATE_TABLE CREATE TABLE TestTable (a int) 1
dbo TestTable DROP_TABLE DROP TABLE TestTable ;       1
```

7. Exemplary Switch Session Context

In an example, replication agent 140 may use a command such as, "execute as user=userName" to switch session context. The following is an example.

```
USE rdb
GO
--Create two temporary principals
CREATE LOGIN login1 WITH PASSWORD = 'J345#$) thb';
CREATE LOGIN login2 WITH PASSWORD = 'Uor80$23b';
GO
CREATE USER user1 FOR LOGIN login1;
CREATE USER user2 FOR LOGIN login2;
GO
--Give IMPERSONATE permissions on user2 to user1
--so that user1 can successfully set the execution context to user2.
GRANT IMPERSONATE ON USER:: user2 TO user1;
GO
--Display current execution context.
SELECT SUSER_NAME( ), USER_NAME( );
-- Set the execution context to login1.
```

```
EXECUTE AS LOGIN = 'login1';
--Verify the execution context is now login1.
SELECT SUSER_NAME( ), USER_NAME( );
--result is:
user1,user1
--Login1 sets the execution context to login2.
EXECUTE AS USER = 'user2';
--Display current execution context.
SELECT SUSER_NAME( ), USER_NAME( );
--result is:
user2, user2
-- The execution context stack now has three principals: the originating
caller, login1 and login2.
--The following REVERT statements will reset the execution context to
the previous context.
REVERT;
--Display current execution context.
SELECT SUSER_NAME( ), USER_NAME( );
--result is:
user1, user1
REVERT;
--Display current execution context.
SELECT SUSER_NAME( ), USER_NAME( );
--result is:
the user before user1, the user before user1
```

8. Exemplary DDL Command Type and Create Object

In an embodiment, each kind of DDL command may have its own DDL type. Examples are presented in Table 2.

TABLE 2

| DDL Statement | DDL Type |
| --- | --- |
| Create table test(id int) | create table |
| Create index on test(id) | create index |
| Create view myview as select * from test | create view |
| Create trigger mytrigger | create trigger |
| Create procedure mypro as . . . | create procedure |
| Create function myfun . . . | create function |

9. Exemplary DDL and Object Relation

In an embodiment, one DDL command may be related to one object. In other words, if one DDL command is executed, it will affect one object. Consider a DDL command "CREATE TABLE" illustrated in the example below:
   CREATE TABLE TEST (ID INT, NAME VARCHAR (50))
In this instance, the DDL command is related to the table TEST.
   In another example, consider a DDL command:
   CREATE INDEX MYINDEX ON TEST(ID).
   As an example, this DDL command creates an index on table TEST, and this DDL command is related to the table TEST.

10. Exemplary Single and Multi-User DDL Transaction

As an example, single DDL transaction may include one DDL.
   Consider the DDL that appears below:
   Begin Transaction Transaction1
   CREATE TABLE TEST (ID INT, NAME VARCHAR (50))
   COMMIT.

In "TRANSACTION1", there is only CREATE TABLE statement. It does not include other DDL or DML, so TRANSACTION1 is a single DDL transaction.
   In another example, a user transaction can include more than one DDL, like:
   BEGIN TRANSACTION TRANSACTION2
   CREATE TABLE TEST (ID INT, NAME VARCHAR (50))
   CREATE INDEX MYINDEX ON TEST(ID)
   COMMIT

11. Example Computer Embodiment

Figure 7:
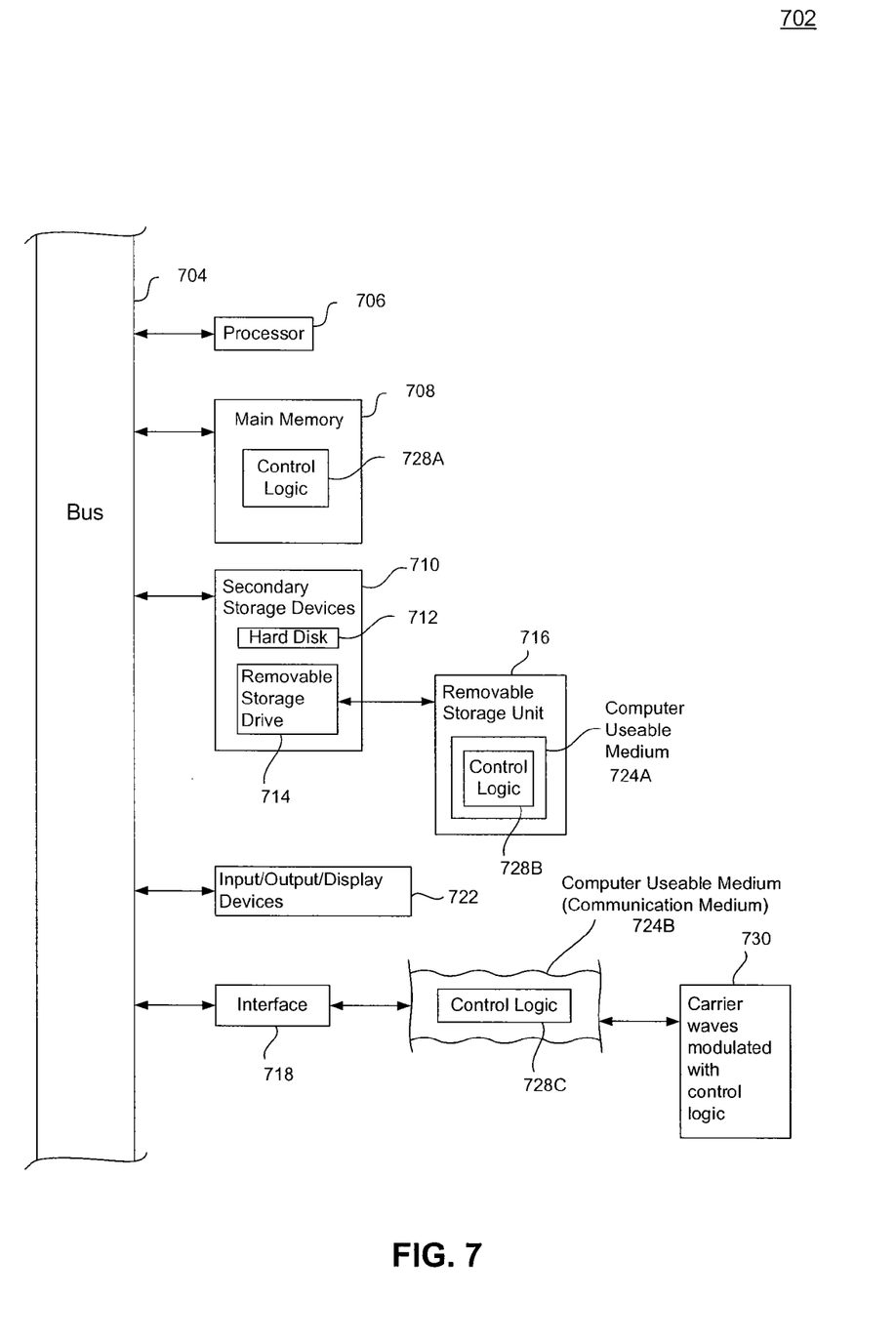
FIG. 7 illustrates an example computer useful for implementing components of the invention.

In an embodiment of the present invention, the system and components of embodiments described herein are implemented using well known computers, such as computer 702 shown in FIG. 7. For example, the operation of flowcharts in FIGS. 4A-4C, 5 and 6 can be implemented using computer(s) 702.

The computer 702 can be any commercially available and well known computer capable of performing the functions described herein, such as computers available from International Business Machines, Apple, Sun, HP, Dell, Compaq, Digital, Cray, etc.

The computer 702 includes one or more processors (also called central processing units, or CPUs), such as a processor 706. The processor 706 is connected to a communication bus 704.

The computer 702 also includes a main or primary memory 708, such as random access memory (RAM). The primary memory 708 has stored therein control logic 728A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or manufacture comprising a computer useable or readable medium having control logic (software) stored therein is referred to herein as a computer program product or program storage device. This includes, but is not limited to, the computer 702, the main memory 708, secondary storage devices 710, the removable storage unit 716 and the carrier waves modulated with control logic 730. Such computer program products, having control logic stored therein that, when executed by one or more data processing devices cause such data processing devices to operate as described herein, represent embodiments of the invention.

The invention can work with software, hardware, and/or operating system implementations other than those described herein. Any software, hardware, and operating system implementations suitable for performing the functions described herein can be used.

12. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   instantiating, by a replication agent, a data definition language (DDL) trigger within a database to capture a DDL event corresponding to a DDL command executed in the database, wherein the DDL trigger analyzes the captured DDL event to retrieve information associated with the DDL event for inserting into a shadow table to store the retrieved information, wherein the inserting causes the retrieved information to be logged in a transaction log;
   obtaining, by the replication agent, the information associated with the DDL event from the logged information in the transaction log upon detecting the insertion of the retrieved information into the shadow table, wherein the obtained information includes a DDL command text of the executed DDL command;
   filtering, by the replication agent, the DDL command text associated with the DDL event captured by the DDL trigger based on a type of the executed DDL command, from the obtained information, to determine whether to send the DDL command text to a replicate database for replication; and
   sending, by the replication agent, the DDL command text to the replicate database for replication responsive to determining that the type of the DDL command permits replication.

2. The method of claim 1, further comprising:
   receiving said DDL command text; and
   executing said DDL command text.

3. The method of claim 2, wherein said executing step further comprises:
   identifying a current user execution context from an execution context stack; and
   executing the DDL command text after checking permissions granted by a login and a user security token associated with the current user execution context.

4. The method of claim 1, further comprising:
   first identifying one or more data manipulation language operations from the DDL command text;
   second identifying one or more DDL operations from the DDL command text; and
   in response to the first and second identifying, adding a current DDL context.

5. The method of claim 4, further comprising:
   third identifying one or more insert operations against the shadow table; and
   in response to the third identifying, ending the current DDL context.

6. The method of claim 1, wherein the retrieved information
   includes user information, further comprising:
   modifying, by the replication agent, said DDL command text with user information to form a modified DDL command text, wherein the modifying enables execution of said DDL command text under a user session context available at the replicate database; and
   sending, by the replication agent, the modified DDL command text to the replicate database for replication in a user context of a user indicated by the user information.

7. The method of claim 1, the second filtering comprising:
   analyzing said DDL command text; and
   providing said DDL command text to a repository filter at the replication agent based on said analysis.

8. The method of claim 1, the filtering comprising:
   using the DDL command type to determine that the DDL command text is associated with creating a DDL command object;
   identifying the DDL command as a system command operating on a DDL system object upon determining that a flag bit associated with the DDL command object is set; and
   blocking the DDL command text from being sent to the replicate database to prevent replication of the system command at the replicate database.

9. The method of claim 1, wherein a repository is at the replication agent, the second filtering comprising:

applying one or more schema changes to a repository for storing created DDL command objects upon determining that the DDL command object is in the repository; and providing said DDL command text to a replication server upon determining that the DDL command object is in said repository.

10. The method of claim 1, wherein the DDL trigger is instantiated in the database responsive to determining that a database table from the database is marked for replication.

11. The method of claim 1, wherein a repository is at the replication agent, further comprising:
filtering the DDL command text upon determining that a DDL command object is not in the repository, wherein the filtered DDL command text is prevented from being sent to the replication database for replication.

12. The system of claim 1, further comprising:
responsive to determining that the executed DDL command relates to creating a DDL command object, filtering the DDL command text to determine whether the DDL command object exists in a repository storing created DDL command objects; and
sending the DDL command text to the replicate database for replication responsive to determining that the type of the DDL command permits replication and that the DDL command object exists in the repository.

13. A computer-based system, comprising:
a first module of a replication agent, configured to instantiate a data definition (DDL) trigger within a database to capture a DDL event corresponding to a DDL command executed in the database, wherein the DDL trigger analyzes the captured DDL event to retrieve information associated with the DDL event for inserting into a shadow table to store the retrieved information, wherein the inserting causes the retrieved information to be logged in a transaction log; and
a second module of the replication agent, configured to:
obtain the information associated with the DDL event from the logged information in the transaction log upon detecting the insertion of the retrieved information into the shadow table, wherein the obtained information includes a DDL command text of the executed DDL command,
filter the DDL command text associated with the DDL event captured by the DDL trigger based on a type of the executed DDL command, from the obtained information, to determine whether to send the DDL command text to a replicate database for replication; and
send the DDL command text to the replicate database for replication responsive to determining that the type of the DDL command permits replication, and wherein the first module and the second module are implemented on one or more processors.

14. The system of claim 13, further comprising:
a third module configured to first identify one or more data manipulation language operations from the DDL command text;
a fourth module configured to second identify one or more DDL operations from the DDL command text; and
a fifth module configured to add a current DDL context upon the first and second identifying.

15. The system of claim 13, wherein the retrieved information includes user information, and wherein the second module is further configured to:
modify the DDL command text with user information to form a modified DDL command text, wherein the modifying enables execution of said DDL command text under a user session context available at the replicate database, and
send the modified DDL command text to the replicate database for replication in a user context of a user indicated by the user information.

16. The system of claim 13, further comprising:
a third module configured to filter said DDL operations; and
a fourth module configured to modify said DDL command text.

17. The system of claim 13, wherein to second filter, the second module is further configured to:
analyze said DDL command text; and
provide said DDL command text to a repository filter at the replication agent based on said analysis.

18. The system of claim 13, wherein to filter, the second module is further configured to:
use the DDL command type to determine that the DDL command text is associated with creating a DDL command object;
identify the DDL command as a system command operating on a DDL system object upon determining that a flag bit associated with the DDL command object is set; and
block the DDL command text from being sent to the replicate database to prevent replication of the system command at the replicate database.

19. The system of claim 13, wherein a repository is at the replication agent, wherein the second module is further configured to:
apply one or more schema changes to the repository upon determining that the DDL command object is in the repository; and
provide the DDL command text to a replication server upon determining that the DDL command object is in the repository.

20. An article of manufacture including a non-transitory computer-readable medium having instructions stored thereon that, when executed by a computing device, cause the computing device to perform operations comprising:
instantiating, by a replication agent, a data definition language (DDL) trigger within a database to capture a DDL event corresponding to a DDL command executed in the database, wherein the DDL trigger analyzes the captured DDL event to retrieve information associated with the DDL event for inserting into a shadow table to store the retrieved information, wherein the inserting causes the retrieved information to be logged in a transaction log;
obtaining, by the replication agent, the information associated with the DDL event from the logged information in the transaction log upon detecting the insertion of the retrieved information into the shadow table, wherein the obtained information includes a DDL command text of the executed DDL command;
filtering, by the replication agent, the DDL command text associated with the DDL event captured by the DDL trigger based on a type of the executed DDL command, from the obtained information, to determine whether to send the DDL command text to a replicate database for replication; and
sending, by the replication agent, the DDL command text to the replicate database for replication responsive to determining that the type of the DDL command permits replication.

21. The article of manufacture of claim 20, the operations further comprising:
  receiving said DDL command text; and
  executing said DDL command text.

22. The article of manufacture of claim 20, wherein the retrieved information includes user information, the operations further comprising:
  modifying, by the replication agent, said DDL command text with user information to form a modified DDL command text, wherein the modifying enables execution of said DDL command text under a user session context available at the replicate database; and
  sending, by the replication agent, the modified DDL command text to the replicate database for replication in a user context of a user indicated by the user information.

\* \* \* \* \*